July 22, 1952

J. P. JONES, JR 2,603,910

MODEL AIRCRAFT REMOTE CONTROL

Filed Oct. 10, 1946

INVENTOR.
JOHN PAUL JONES, JR.
BY
HIS ATTORNEY

July 22, 1952  J. P. JONES, JR  2,603,910
MODEL AIRCRAFT REMOTE CONTROL
Filed Oct. 10, 1946  3 Sheets-Sheet 2
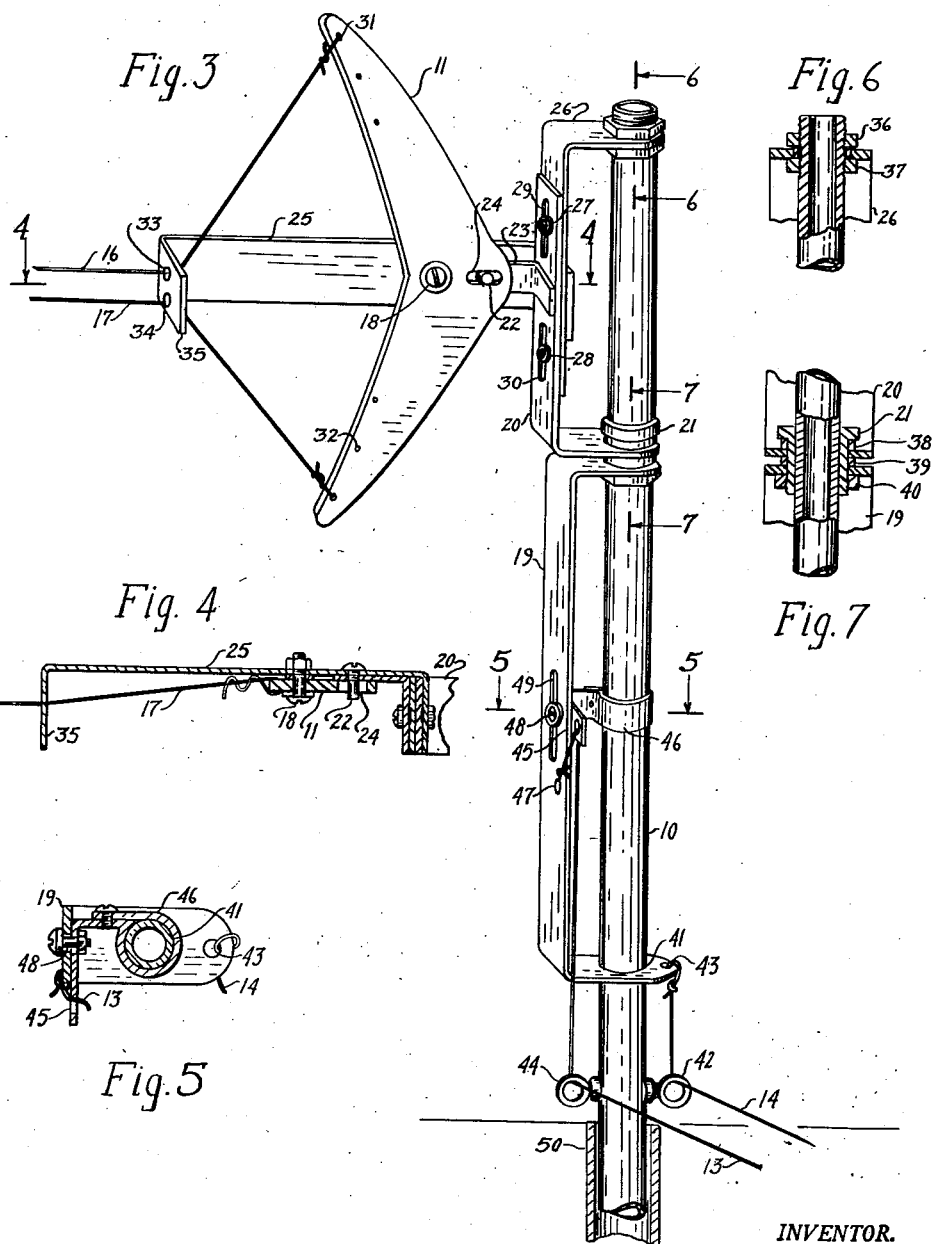
INVENTOR.
JOHN PAUL JONES, JR.
BY Joshua R. Potts
HIS ATTORNEY July 22, 1952 J. P. JONES, JR 2,603,910
MODEL AIRCRAFT REMOTE CONTROL
Filed Oct. 10, 1946 3 Sheets-Sheet 3

INVENTOR.
JOHN PAUL JONES, JR.
BY
HIS ATTORNEY

Patented July 22, 1952

2,603,910

UNITED STATES PATENT OFFICE 2,603,910

MODEL AIRCRAFT REMOTE CONTROL

John Paul Jones, Jr., Pottstown, Pa.

Application October 10, 1946, Serial No. 702,540

4 Claims. (Cl. 46—77)

This invention relates to control devices for model or captive aircraft, and in particular, a remote control wherein an operator may be located outside of the flight circle and control the aircraft from a central swivel post or stick.

With the increasing speed of model or captive-type aircraft, an operator positioned at the center of the flight circle must turn at a relatively rapid rate of speed because, in order to maintain tension in the control lines, he must face the plane continuously.

In order to relieve the operator and remove this unpleasant condition, the device of this invention contemplates a stationary post at the center of the flight circle with a control element to which the control lines are connected, rotatably mounted on the post, and provided with a control lever operable through a swivel connection by control lines extending downward on the post and across the ground to the operator, who is preferably positioned outside of the flight circle.

In starting model aircraft, more than one person is normally required because the control lines must be held from the center of the flight circle by one person, while another starts the aircraft. With the control device of this invention, wherein the operator is positioned just outside of the flight circle, he may hold the control lines with one hand and start the aircraft with the other. It is, therefore, possible for one person to fly and control the flight of model aircraft of this type.

With this type of control, in which the operator is not required to turn and may, therefore, remain comparatively stationary, the aircraft may be controlled by a lever or stick corresponding to the stick of large aircraft, and the operator may, therefore, "feel," and at the same time, see the result of the movements of the stick and control lines.

With the aircraft operating about and controlled from a fixed point, the flight circle will be precisely defined and will not vary, and with the aircraft traveling in a fixed path, control levers may extend from the tip of the wing on the outside, or from other parts therefrom that may engage signal control posts to speed up or slow down the plane, or to control other elements thereof.

In operating model or captive aircraft by control lines held in the hand of an operator standing in the center of the flight circle, the distance between the point at which the lines are held and the center of the circle obviously varies; whereas, with the control lines operating continuously about a fixed point, the movement of one line in relation to another may be scientifically controlled so that with a plurality of points on a control lever to which connections to the control lines may be made, the movement of one line in relation to the other may be definitely controlled to precisely influence the operation of the aircraft.

With the control lines from the aircraft fastened to a control element rotating on a stationary element at the center of the flight circle, and with the rotating member operated by additional control lines, adjustments in the controls are greatly multiplied so that greater sensitiveness in the controls is obtained.

Furthermore, with the sensitive controls obtained by the control elements of this invention, the distance between the control lines may be reduced to a minimum wherein the controls will not be affected by the altitude of the aircraft.

The small distance provided between the two control lines between the central post and the aircraft has the effect of opposing any tendency of the aircraft to climb or descend, thus increasing the stability of the aircraft.

The purpose of this invention is, therefore, to increase the efficiency of handling model or captive aircraft by connecting the control lines of the aircraft to a rotating element on a fixed member in the center of the flight circle and controlling the rotatable element by control lines from a point outside of the flight circle.

Model or captive aircraft is subjected to many hazards in flight, particularly because the control lines are held in the hand of an operator, and as the operator turns to follow the aircraft, the distance between the aircraft and the center of the circle obviously varies so that it is substantially impossible to hold the lines with the same tension continuously. Model aircraft is, therefore, subject to climbing and descending, and the descent often results in nose dives which almost invariably break the propellers and often cause serious damage to the aircraft.

One object of this invention is, therefore, to provide means for scientifically controlling the flight of model aircraft.

Another object is to provide means for controlling the flight of model aircraft from a point outside of the flight circle.

Another object is to provide means for controlling the flight of model aircraft wherein the aircraft may be started and controlled by one person.

Another object is to provide means for controlling model aircraft through a fixed point in the center of the flight circle of the aircraft.

Another object is to provide means for controlling the flight of model aircraft wherein the control elements may readily be adjusted.

Another object is to provide means for holding model aircraft in a fixed path of flight wherein control elements may extend from the aircraft to engage signal or control devices as the aircraft passes.

A further object is to provide the usual "stick" similar to the stick used in large aircraft, for controlling model aircraft, and means for locating the stick outside of the flight circle with controls extending from the stick to the center of the circle, and from the center of the circle to the aircraft.

With these and other objects in view, the invention embodies a post adapted for positioning in the center of a flight circle of model aircraft, sliding elements on the post, control lines extending from the sliding elements to a model aircraft, a stick positioned outside of the flight circle, and control lines extending from the stick to the slidable element on the post.

For a full and more complete understanding of the invention, reference may be had to the following description and accompanying drawings wherein:

Figure 3 illustrates the construction of a control post that may be positioned at the center of a flight circle.

Figure 4 is a section on line 4—4 of Figure 3 showing the mounting of the control lever.

Figure 5 is a section on line 5—5 of Figure 3 showing the relative positions of the connections from the stick illustrated in Figure 2 to the control lever.

Figure 6 is a section on line 6—6 of Figure 3 showing the construction of the upper end of the post.

Figure 7 is a section on line 7—7 of Figure 3 illustrating the sliding connection between the controls from the operating stick and the controls of the control lever.

Figure 1:
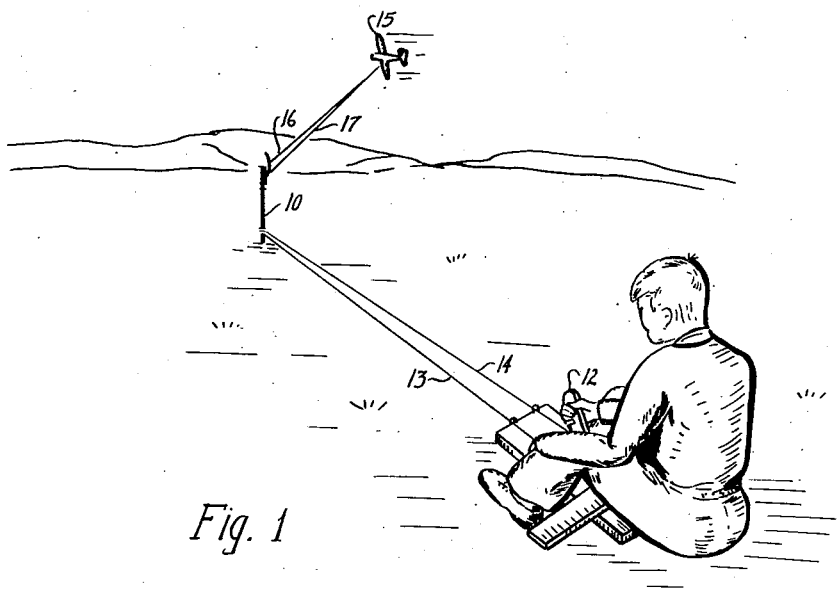
Figure 1 illustrates the method of operation of the aircraft with the remote control apparatus of this invention.
Figure 2:
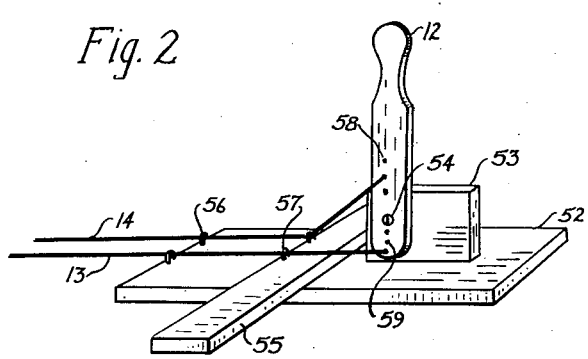
Figure 2 illustrates a typical mounting of the stick by which the controls are operated.

Referring now to the drawings wherein like reference characters denote corresponding parts, the model aircraft control apparatus of this invention includes a control post 10 adapted for positioning at a stationary point in the center of the circle of flight, a control lever 11 positioned adjacent the upper end of the post 10, and a control stick 12 positioned at a remote point preferably outside of the circle of flight of the aircraft. The stick 12 is connected to the post 10 by lines 13 and 14, and the aircraft 15 is connected to the control lever 11 on the post through lines 16 and 17.

With the post 10 positioned in the center of the flight circle, the stick 12 may be operated to control the aircraft by turning the control lever 11 about the point 18, through a sliding yoke 19 and a sliding lever 20, with the yoke 19 moving upward on the post 10 as the stick is moved forward, and downward as the stick is moved backward. The yoke 19 moves the lever 20 upward or downward through the coupling member 21, and the movement of the lever 20 operates the control lever 11 through a pin 22 on a clip 23, wherein the pin extends into a slot 24 in the lever 11.

The lever 11 is pivotally mounted through the pin 18 on a brace 25 that extends horizontally outward from a bracket 26 against which the lever 20 is slidably held by pins 27 and 28 which extend from the bracket 26 through slots 29 and 30 in the lever. With the brace 25 held stationary in relation to the bracket 26, the lever 20, which is moved upward and downward by the stick 12 through the lines 13 and 14 and yoke 19, moves the pin 22 upward and downward, and the movement of the pin extending into the slot 24 turns the lever about the pin 18, causing it to draw the line 17 inward as the lower end of the lever moves backward, and the line 16 inward as the upper end of the lever moves backward. The relative movement of the lines 16 and 17 may be adjusted or controlled by locating the ends of the lines in the different openings 31 and 32 extending through the ends of the lever. The lines 16 and 17 may be connected to the lever 11 through the openings 31 and 32 in any manner, and from these openings the lines extend through openings 33 and 34 in an extending end 35 of the brace 25.

The upper yoke formed by the lever 20 and the bracket 26 is freely mounted for rotation at the upper end of the post, providing a swivel connection with the bracket 26 mounted to prevent vertical movement on the post, and the lever 20, mounted on the sliding connector 21, adapted to move upward and downward causing the pin 22 to move upward and downward in relation to the pin 18 of the control lever 11. To provide the swivel or rotatable connection, the upper end of the clip 26 is freely held by the nuts 36 and 37 at the upper end of the post, and the lower end of the lever 20 is freely held between washers 38 and 39 at the upper end of the sliding sleeve 21. The upper end of the yoke 19 is also held on the sliding sleeve 21 by a nut 40 on the lower end of the sleeve. The lower end of the yoke 19 is slidable on the post, having an opening 41 therein through which the post extends, although it is not adapted for rotation thereon.

As illustrated in the drawing, the yoke 19 may be drawn downward by the line 14 extending from the stick 12 through an eye 42 and connected to the end of the yoke at the point 43. The yoke may also be moved upward by moving the stick 12 in the opposite direction, which causes a pull on the line 13 that extends through an eye 44 and through an opening 45 in a fixed clip 46 on the post. From the opening 45, the line 13 extends downward to an opening 47 where it is connected to the yoke 19 so that a pull on the line 13 pulls or operates the yoke 19 upward. The yoke 19 is slidably held to the clip 46, which prevents rotation of the yoke, by a pin 48 on the clip, the pin extending through a slot 49 in the yoke.

Figures 8, 9, 10:
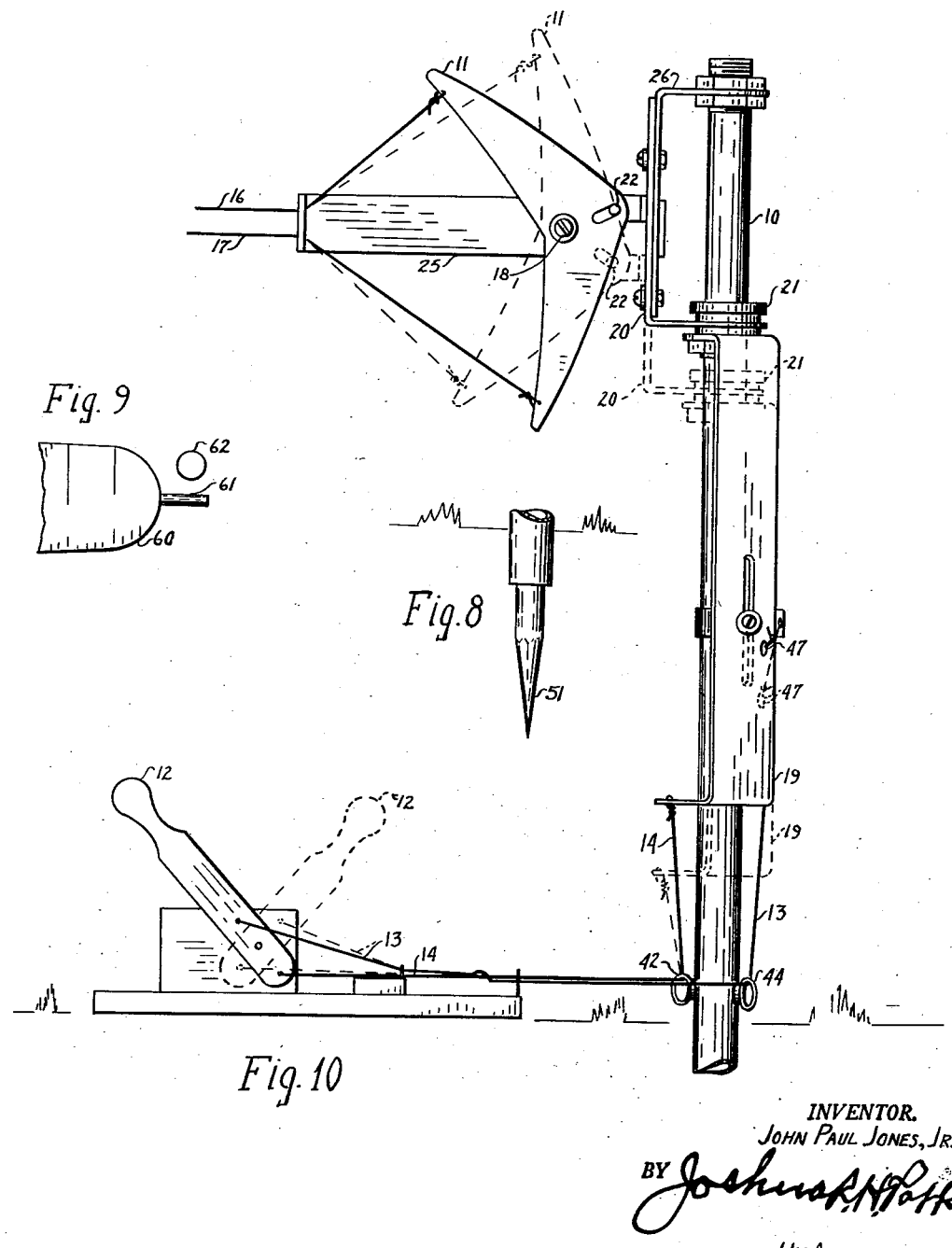
Figure 8 is a detail illustrating the post shown in Figure 3 with the lower end pointed so that it may be forced into the ground.
Figure 9 is a detail illustrating the tip of a wing of the aircraft with a lever extending therefrom that may contact a trip positioned just outside of the flight circle.
Figure 10 is a view showing the control post at the center of the flight circle, illustrating the sliding movement of the control elements with the neutral position of the elements illustrated in dotted lines, and with the elements shown in full lines in the upper position.

The lower end of the post 10 may be placed in a socket or tube 50 that may be buried in the ground for this purpose, or the post may be provided with a pointed end 51, as shown in Figure 8, so that it may readily be forced or driven into the ground. It will be understood that the post may be mounted in any suitable manner.

The stick 12 may also be mounted upon any suitable device, and in the design shown, it is illustrated as mounted on a base 52, which is provided with a block 53 on which the stick is pivotally mounted through a bolt 54. The base 52 may be provided with a cross member 55 providing means for holding the base by the feet of the operator, and the upper surface may also be provided with eyes 56 and 57, through which the lines 13 and 14 may extend. The stick 12 may also be provided with openings 58 and 59, which are spaced at different distances from the center of the pivot so that the relative movement of the lines may be adjusted by connecting the ends of the lines to the stick in the different openings.

In Figure 9, a tip 60 of a model airplane is shown as having an extending control lever 61 that is positioned to engage a signal post or device 62 wherein means may be provided for adjusting controls or signals in the aircraft during flight. With the fixed control post at the center of the flight circle, the tips of the wings will travel in a definite path and with a post or obstruction of some form positioned just outside of the flight circle, a lever extending from the tip of the wing may be operated by the post as the aircraft passes. The post or device 62 may also be in the form of a lever or other device that may operate adjustments on the aircraft or that may be operated by the aircraft, as may be desired.

The construction of the model aircraft control apparatus of this invention will be readily understood from the foregoing description. In operation, an operator may first start the engine of the aircraft, and holding the aircraft in one hand and the stick 12 in the other, the aircraft may be released with the operator having complete control thereof from the beginning of the flight, and at the same time, a single operator may start and control the aircraft. With the lines of control connecting the control elements of the aircraft to a fixed post in the center of the flight circle, and with control elements on the post controlled by lines extending to a stick at a point outside of the flight circle, it is possible to hold the control lines in tension at all times, and at the same time, provide adjustments in the connections of the lines so that very sensitive control of the aircraft may be provided continuously throughout the flight thereof.

While a preferred specific embodiment of the invention is hereinbefore set forth, it is to be clearly understood that the invention is not to be limited to the exact construction illustrated and described because various modifications of the details may be provided in putting the invention into practice within the purview of the appended claims.

What is claimed is:

1. In a remote control apparatus for model aircraft, in combination, a post, an element fixed to said post, means slidably mounted on the post, flexible means connected to the element and the means, said flexible means being effective to raise and lower the first-mentioned means, a first member turnably mounted on the post but prevented from axial movement thereon, a second member slidably attached to said first-mentioned member and connected to said first-mentioned means, control means rockably connected to said first member and operable by said first-mentioned slidable means and said second member, and other flexible means connecting the control means to a model aircraft; whereby when the first mentioned flexible means are operated, the last-mentioned flexible means will be moved to control the flight of said aircraft.

2. In a remote control apparatus for a model aircraft, in combination, a central post, a pair of members slidably mounted on said post with one of said members rotatable on said post, a bracket rotatably mounted on said post, said one of said members being in sliding engagement with said bracket, a brace fast to said bracket, a control lever rockable on said brace, means connecting said lever to said one of said members, a pair of lines connected to said lever and to an aircraft, a second pair of lines connected to the other of said members, and manually operable instrumentalities for moving said last mentioned pair of lines.

3. In a remote control apparatus for a model aircraft, a post, a pair of means turnably mounted on said post, one of said means being slidable relative to the other of said means, flexible means connected to said one of said means and effective for raising it relative to the post, a control lever rockably mounted on an element connected to said other of said means, and other flexible means secured to the control lever, said last-mentioned flexible means being connectible to an aircraft.

4. In a remote control apparatus for a model aircraft, a post, a pair of means turnably mounted on said post, one of said means being slidable relative to the other of said means, an element fixed to said post, flexible means connecting the fixed element and said one of said means, a control member arranged adjacent the post and pivotable relative to the means, an operative connection between the control member and at least one of the said pair of means, and other flexible means secured to the control member and connectible to a remote aircraft.

JOHN PAUL JONES, JR.

REFERENCES CITED

The following references are of record in the file of this patent:

UNITED STATES PATENTS

| Number | Name | Date |
|---|---|---|
| 1,937,241 | Pardue et al. | Nov. 28, 1933 |
| 2,061,953 | Sampson | Nov. 24, 1936 |
| 2,067,828 | Christiansen | Jan. 12, 1937 |
| 2,390,307 | Kelecius | Dec. 4, 1945 |
| 2,432,119 | Nash et al. | Dec. 9, 1947 |